Patented Oct. 9, 1928.

1,686,603

UNITED STATES PATENT OFFICE.

JOHN H. DEPPELER, OF WEEHAWKEN, NEW JERSEY, ASSIGNOR TO METAL & THERMIT CORPORATION, OF CARTERET, NEW JERSEY, A CORPORATION OF NEW JERSEY.

METHOD OF WELDING HIGH-CARBON STEEL.

No Drawing.   Application filed August 29, 1925.  Serial No. 53,428.

The invention relates to a method of welding high-carbon steel bodies, such for example as railway rails, to effect substantial homogeneity of structure and practical uniformity of wear resisting qualities at the joints, to which ends the method comprises interposing a body of low carbon steel or iron between the bodies to be welded and welding together the adjacent surfaces of all of said bodies, the welding, preferably, being effected by means of alumino-thermic steel teemed into and about the joint, as will be pointed out more particularly hereinafter.

In the welding of steel bodies, such as railway rails, by the thermit method, two procedures have been followed heretofore, one involving the application of superheated thermit steel about and between the ends of the rails or elements to be joined, thereby causing the parts in contact with the molten thermit steel to fuse and ultimately to coalesce and solidify with the molten steel to form what may be termed a fusion joint, the other method involving the butt welding of the elements which comprises the heating of the bodies to be welded together at or about the joint and forcing the highly heated elements together, the heating in this case also being preferably effected by superheated thermit steel poured about the joint. For the welding of parts made of low carbon steel, such as pipes, rods, bars and the like, both types of welds have proven entirely satisfactory and practically homogeneous joints have been produced, which, in some instances, have exhibited strength even greater than the welded elements themselves, which is caused by the excess metal at the joint.

It has been proposed heretofore to effect a combination butt and fusion weld between high carbon steel bodies, such as railway rails, as exemplified in Patent No. 1,153,435, dated September 14, 1915, by inserting a shim or section of metal of the same character as the rails between the ends of the rail heads and then welding said intermediate piece of metal to the rail ends by the application of aluminothermic iron or steel, which effects a fusion weld between the portions of the rail which are not in engagement with the inserted metal. The object of this particular form of combination butt and fusion weld between rail ends was to provide a wear resisting element between the rail ends represented by the butt weld insert, so that the wearing action of the car wheels would be no greater and no less at the joints than on the bodies of the rails. As indicated, no difficulty is encountered in securing practically perfect butt welds between steel bodies of low carbon content, but, in rail welding practice in which the steels contain from .60 to .85% carbon, it has frequently been found difficult and impracticable to produce an effective butt weld between the heads of the rails and the insert of steel of the same carbon content as the rails.

It has been found, however, after a long series of tests, that, by employing an insert of low carbon steel between the faces of the high carbon steel to be welded, practically perfect butt welds or combination butt welds and fusion welds will result, and in the case of railway rails, if due attention be given to the character and disposition of the insert, the joint will not only be uniform as to structure, but will offer the same resistance to wear under the action of the car wheels, as the body of the rails. It is proposed, therefore, to use inserts of low carbon steel or iron that are relatively thin and, in the case of butt welding the heads of railway rails, the insert or interposed body of low carbon steel or iron is disposed in the same relative position with respect to the portions of the rails subject to wear, as exemplified in Patent No. 1,153,435 aforesaid, and the joint completed by the application of highly heated molten metal, such as thermit steel, about the joint, in the same manner as described in said patent.

Under the action of the heat developed by the thermit steel, the union of the low carbon steel of the insert with the high carbon steel of the rail ends is so effective that, when the joint is examined under the microscope, it is found that the pearlite of the high carbon steel has migrated to an appreciable and material distance into the ferrite of the low carbon steel, and, vice versa, the ferrite has penetrated to a considerable depth the pearlite structure of the high carbon steel, so that the metal joint is practically uniform in structure and wear resisting qualities.

As indicated, the interposed body of iron or steel, low in carbon, or even without carbon, is preferably quite thin and may even constitute what is in effect a mere surface covering of the adjacent portions of the rail ends to be butt welded. The desired result may be obtained in various ways, such for example as inserting a thin sheet of low carbon steel between the rail heads, or the insert may be in the form of two thin plates of low carbon steel with an interposed sheet of high carbon steel. As alternatives, the portions of the rail head ends to be butt welded, or an insert of high carbon steel, may have a coating of low carbon steel applied thereto. This coating need not, of course, be actually joined to the high carbon steel before the butt weld is accomplished, but it will obviously be more convenient as a matter of practical manipulation if an actual physical jointure of the high and low carbon steels be effected, particularly in the case of inserts, as by electrolytically depositing low carbon steel or iron on the butt weld surfaces of the insert or on the end surfaces of the rail heads to be butt welded, or by rolling high carbon steel between two plates of low carbon steel at a temperature which will cause them to weld or cohere sufficiently to permit them to be handled.

It is to be understood that low carbon steel and practically pure iron are substantially equivalent in the operation of the method as described and may be used interchangeably. Therefore, the term low carbon steel or iron will be understood as indicating a ferrous body, either practically without carbon content or with a percentage of carbon sufficiently low to insure an effective, homogeneous and uniform fusion and welding of all of the parts of the butt joint.

What I claim is:

1. The method of welding high carbon steel bodies which comprises interposing a body of low carbon iron between the elements, and butt welding together the adjacent surfaces of said bodies by the application of heat and pressure.

2. The method of welding high carbon steel bodies which comprises interposing a thin body of low carbon iron between the elements, and butt welding together the adjacent surfaces of said bodies by the application of heat and pressure.

3. The method of welding high carbon steel bodies which comprises interposing a thin body of low carbon iron between the elements and butt welding the adjacent surfaces of said bodies by contact with highly heated molten metal.

4. The method of welding high carbon steel bodies which comprises interposing a thin body of low carbon iron between the elements and butt welding the adjacent surfaces of said bodies by contact with molten alumino-thermic metal.

5. The method of welding high carbon steel bodies which comprises interposing a thin body of low carbon iron between the elements and butt welding the adjacent surfaces of said bodies by pressure and by contact with highly heated molten metal.

6. The method of welding high carbon steel bodies which comprises interposing a thin body of low carbon iron between the elements and butt welding the adjacent surfaces of said bodies by pressure and by contact with molten alumino-thermic metal.

In testimony whereof I affix my signature.

JOHN H. DEPPELER.